United States Patent
Ganesan et al.

(10) Patent No.: US 8,111,814 B2
(45) Date of Patent: Feb. 7, 2012

(54) EXTENSIBLE ALERT TYPES

(75) Inventors: Krishnamurthy Ganesan, Redmond, WA (US); Adrian Potra, Bellevue, WA (US); Sundaram Anantharaman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/386,037

(22) Filed: Mar. 20, 2006

(65) Prior Publication Data

US 2007/0220138 A1    Sep. 20, 2007

(51) Int. Cl.
H04M 1/64    (2006.01)

(52) U.S. Cl. ............... 379/88.17; 370/354; 709/206

(58) Field of Classification Search ........ 379/88.17, 379/142.06, 207.15, 207.16; 370/352–356; 709/206; 455/566
See application file for complete search history.

(56) References Cited

U.S. PATENT DOCUMENTS

| | | | |
|---|---|---|---|
| 5,969,705 A * | 10/1999 | Fisher et al. ................. 715/764 |
| 6,272,556 B1 * | 8/2001 | Gish ............................ 719/315 |
| 6,282,269 B1 * | 8/2001 | Bowater et al. ........... 379/88.17 |
| 6,378,001 B1 | 4/2002 | Aditham et al. |
| 6,400,275 B1 | 6/2002 | Albers |
| 6,550,061 B1 * | 4/2003 | Bearden et al. .............. 717/174 |
| 6,553,110 B1 * | 4/2003 | Peng ....................... 379/210.03 |
| 6,671,370 B1 * | 12/2003 | Heinonen et al. ........ 379/373.02 |
| 6,721,397 B1 * | 4/2004 | Lu ............................. 379/88.11 |
| 6,748,436 B1 | 6/2004 | Anand et al. |
| 6,931,007 B2 * | 8/2005 | Jones ............................ 370/392 |
| 6,977,993 B2 * | 12/2005 | Starbuck et al. ........... 379/88.21 |
| 7,110,763 B2 * | 9/2006 | Suhail et al. ............... 455/435.1 |
| 7,187,671 B2 * | 3/2007 | Moyano et al. ............... 370/353 |
| 7,376,129 B2 * | 5/2008 | Acharya et al. .............. 370/352 |
| 2003/0055768 A1 | 3/2003 | Anaya et al. |
| 2004/0148411 A1 | 7/2004 | Blawat et al. |
| 2004/0243453 A1 | 12/2004 | Call et al. |
| 2005/0021652 A1 | 1/2005 | McCormack |
| 2005/0053018 A1 | 3/2005 | Hoppe-Boeken et al. |
| 2005/0226240 A1 | 10/2005 | Hoffmann et al. |

OTHER PUBLICATIONS

LanTalk Net, http://www.exxzero.com/?inref=www_cezeo_com, 3 pages [Internet accessed Jan. 16, 2006].
RealPopup, http://www.realpopup.it/features.html, 2 pages [Internet accessed Jan. 16, 2006].
LANsurveyor® 9.5 for Windows, http://www.neon.com/Manuals/LSwinMan/index.html?alerts.htm, 2 pages [Internet accessed Jan. 16, 2006].

* cited by examiner

*Primary Examiner* — Simon Sing
(74) *Attorney, Agent, or Firm* — Perkins Coie LLP (57) ABSTRACT

A facility for providing extensible alert types is described. The facility includes an endpoint component that has an associated application, an alert handler component provided by the application for handling received messages and providing alerts to the application, and a message transport component that receives a message, determines whether the message contains an alert, locates an alert handler to handle the alert, and provides a portion of the received message to the alert handler component so that the alert handler component can handle the alert. The facility can receive a request to register an alert handler, add an indication of the alert handler in a mapping data structure and, upon receiving a message containing an alert, identify an alert handler to handle the alert contained in the message.

20 Claims, 6 Drawing Sheets

EXTENSIBLE ALERT TYPES

BACKGROUND

Participants in a networked environment sometimes need to communicate commands or announcements to other participants. Participants are applications, users, and generally any entity that uses services provided by the networked environment. Examples of commands include "restart the operating system," "close the application," and so forth. Examples of announcements include "service is terminating," global positioning system coordinates of a user, team meetings, and so forth. These commands or announcements can be referred to as alerts. The source and target of these alerts are endpoints, which are devices or software that represent a participant in the networked environment. Each participant can have multiple endpoints. As an example, a user or application can use a mobile computer as an endpoint as well as a desktop computer as an endpoint. Some or all endpoints associated with a participant may need to receive alerts.

The endpoints may employ various mechanisms to communicate messages to one another, such as a Session Initiation Protocol ("SIP"). SIP is an application-layer control protocol that endpoints can use to discover one another and to establish, modify, and terminate communications sessions. SIP is an Internet-proposed standard. Its specification, "RFC 3261," is available at the Internet Engineering Task Force's web site (www.ieff.org). A specification for extensions to SIP relating to event notifications, "RFC 3265," is also available at the web site. Both of these specifications are incorporated herein in their entirety by reference.

An exchange of messages during a SIP session is generally referred to as a dialog. SIP may use lower-level communications layers to transport a dialog's messages, such as Transmission Control Protocol/Internet Protocol ("TCP/IP"), which are commonly employed transport- and network-layer protocols. SIP messages can also be sent outside dialogs. This is sometimes referred to as Page Mode. In Page Mode, a sender sends a SIP message to a recipient without any expectation of a session being established. SIP Page Mode messages are generally characterized by their lack of Contact header fields. SIP supports multiple message types, including MESSAGE and NOTIFY. Initial messages (whether MESSAGE or NOTIFY) that are sent before a session or dialog is established are referred to as requests.

SUMMARY

A facility for providing extensible alert types is described. In various embodiments, the facility provides an application programming interface ("API") for applications to register and handle alert types so that applications can employ the facility to send or receive alerts. The facility transports alerts using a messaging or control protocol ("protocol"), such as SIP. Each application derives an alert object from a base alert object that the facility defines. The derived alert object implements various methods the facility employs when it sends or receives an alert, including methods for handling alerts. The application registers the derived alert object with the facility. Each derived alert object can handle one or more alert types. The facility creates mappings between alert types and alert objects, such as in a mapping table. Each alert object implements various methods. A serialize method transforms data types associated with the alert object into a data type that the protocol recognizes, such as plain text or Unicode Transformation Format in the case of SIP, so that the alert can be sent using the protocol. A deserialize method transforms incoming alerts from the data type employed by the protocol into the data types associated with the alert object. A handle_alert method performs logic associated with the alert. As an example, the facility can invoke the handle_alert method to communicate the alert to an application that registered to handle the alert. When a message arrives, the facility determines if it is an alert and the type of alert from a header field of the message. As an example, the facility may determine that a SIP message is an alert and derive the alert type from a Content-type field contained in a header section of the message. The facility determines which registered alert object corresponds to the alert type and invokes the handle_alert method of that alert object so that the alert can be communicated to the appropriate application. Thus, many applications can be configured to send or receive alerts using the facility.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A facility for providing extensible alert types is described. In various embodiments, the facility provides an application programming interface ("API") for applications to register and handle alert types so that applications can employ the facility to send or receive alerts. The facility transports alerts using a messaging or control protocol ("protocol"), such as SIP. Each application derives an alert object from a base alert object that the facility defines. The derived alert object implements various methods the facility employs when it sends or receives an alert, including methods for handling alerts. The application registers the derived alert object with the facility. Each derived alert object can handle one or more alert types. The facility creates mappings between alert types and alert objects, such as in a mapping table. Each alert object implements various methods. A serialize method transforms data types associated with the alert object into a data type that the protocol recognizes, such as plain text or Unicode Transformation Format ("UTF") in the case of SIP, so that the alert can be sent using the protocol. A deserialize method transforms incoming alerts from the data type employed by the protocol into the data types associated with the alert object. A handle_alert method performs logic associated with the alert. As an example, the facility can invoke the handle_alert method to communicate the alert to an application that registered to handle the alert. When a message arrives, the facility determines if it is an alert and the type of alert from a header field of the message. As an example, the facility may determine that a NOTIFY type of SIP message is an alert and derive the alert type from a Content-type header field contained in a header section of the NOTIFY message. In some embodiments, the facility may determine that other SIP message types are alerts and may derive the alert type from a Content-type header field contained in a header section of the message. The facility determines which registered alert object corresponds to the alert type and invokes the handle_alert method of that alert object so that the alert can be communicated to the appropriate application. Thus, many applications can be configured to send or receive alerts using the facility.

In some embodiments, the facility may invoke access control logic, such as before a message is sent or an incoming message is processed. As an example, alert objects, applications, or some other component may provide access control logic to determine whether or not a particular alert type or message is to be sent or received.

In some embodiments, alerts may provide an indication of an expiry. When an alert expires, the facility may ignore the alert. In such a case, the facility may determine not to invoke the deserialize or handle_alert methods associated with the alert type.

In some embodiments, the base alert object of the facility provides an AlertManager class that the derived alert objects extend to implement their methods. In some embodiments, the AlertManager class provides an interface that derived alert objects employ without extending the class. The following is a template definition for the AlertManager class. While the templates illustrated below are described in a C# template language, they could also be described in other languages to provide similar functionality.

```
public abstract class AlertManager
{
    public abstract void AddAlertHandler < T >(EventHandler
<AlertEventArgs < T > > handler) where T : Alert;
    public abstract IAsyncResult BeginSendAlert(Alert alert, string
receiverAddress, AsyncCallback userCallback, object state);
    public abstract void EndSendAlert(IAsyncResult asyncResult);
    public abstract void RemoveAlertHandler < T >(EventHandler <
AlertEventArgs < T > > handler) where T : Alert;
    public void SendAlert(Alert alert, string receiverAddress);
}
```

According to the template, the AlertManager class defines five methods: AddAlertHandler, BeginSendAlert, EndSendAlert, RemoveAlertHandler, and SendAlert.

The AddAlertHandler method registers a handler for an alert type. This method takes an indication of an alert handler as a parameter.

The BeginSendAlert method asynchronously sends an alert to an alert recipient. This method takes four parameters. An alert parameter indicates an object containing the alert that is to be sent. A receiverAddress parameter identifies the alert recipient (e.g., by using an IP address). A userCallback parameter identifies a method that is to be invoked when the alert has been sent. A state parameter provides state information that the callback method can employ when it is called. This method returns a reference to the object that is performing the asynchronous sending. This returned object is analogous to a cookie that can be employed to indicate to the callback method which operation has completed.

The EndSendAlert method waits for the pending asynchronous sending operation to complete. This method receives a reference to the object that is performing the asynchronous sending, such as the reference returned by the BeginSendAlert method. In some embodiments, this method receives a cookie that identifies an operation that the method should wait for to complete.

The RemoveAlertHandler method deregisters a previously registered alert handler. The method receives an indication of an alert handler to deregister.

The SendAlert method sends an alert synchronously. This method receives an alert parameter that indicates an object containing the alert that is to be sent and a receiverAddress parameter that identifies the alert recipient (e.g., an IP address).

The following class template defines a base alert object from which alert objects derive, such as the alert objects provided to the asynchronous and synchronous methods that send alerts:

```
public abstract class Alert
{
    public ContentType ContentType;
    public byte[ ] Body;
    public int Expires;
    public Time Time;
    public Headers[ ] Headers;
}
```

The ContentType property indicates the content type of the alert. Examples of content types are text, rich text, HTML, binary, integer, and any other basic or complex data type, including compound data types that contain multiple other data types. Application-specific data types are also possible, such as application/zip.

The Body property indicates the body of the message, such as in a binary format.

The Expires property indicates the amount of time, such as in seconds, that an alert that is to be made visible is displayed to a user. In some embodiments, the Expires property indicates a time after which an alert is invalid.

The Time property indicates the time from which expiry time is to be calculated. As an example, the Time property may be based on a time indicated as the time the alert was sent by the sender or received by the recipient. The alert would then expire the number of seconds indicated by the Expires property after the time indicated by the Time property.

The Headers property provides an array of headers that were included with the alert, such as the SIP headers.

The following class template defines an AlertEventArgs class that the facility employs to report an alert to an application that registers an object to receive alerts.

```
public sealed class AlertEventArgs<T> : EventArgs
where T : Alert
{
    public T Alert;
    public Participant RemoteAddress;
    public ResponseCode ResponseCode;
}
```

The Alert property is an indication of an alert object, such as an alert object that derives from a base alert object that was defined above.

The RemoteAddress property is an address indicating an endpoint that sent the alert.

The ResponseCode parameter can be set by the alert handler to return a response code to the sender of the alert. As an example, the facility may default this response code to 200, which indicates that a SIP message was successfully received.

The facility creates mappings between alert types and alert objects. In some embodiments, the facility employs a mapping table to track these mappings. The following is an example of a table for tracking mappings between alert types and objects:

TABLE 1

Handler Mappings

| Application | Object | Handler/Alert Type |
|---|---|---|
| Application 1 | Object A | Handler 1/Alert Type a |
| | | Handler 2/Alert Type b |
| Application 2 | Object B | Handler 3/Alert Type c |
| | | Handler 4/Alert Type d |
| | | Handler 5/Alert Type b |

When the facility receives an alert, it determines from the mapping table which handler should handle the alert. As an example, when the facility receives a message that contains an Alert Type "a," the facility determines that Handler 1 should receive the alert. As indicated in the mapping table, Handler 1 is associated (e.g., defined by) Object A. Object A, upon handling the alert, may communicate the alert to Application 1. In some embodiments, multiple handlers may handle a particular alert type. As an example, the mapping table indicates that Alert Type "b" is handled by Handler 5 and Handler 2. In various embodiments, the facility may provide the alert to either or both handlers.

While Table 1 illustrates a table whose contents and organization are designed to make it more comprehensible by a human reader, actual data structures used by the facility to store this information may differ from the table shown, in that they, for example, may be organized in a different manner; may contain more or less information than shown; may be compressed and/or encrypted; etc.

In some embodiments, some other data structure can be used to track the mappings instead of, or in addition to, a table.

In some embodiments, when using SIP to communicate alerts, the facility may employ Page Mode messages because no dialog needs to occur. That is, a sender of an alert does not need to await a response from the recipient of the alert. Alerts can be either NOTIFY or MESSAGE types of SIP messages. In some embodiments, other message types may be employed.

Figure 1:
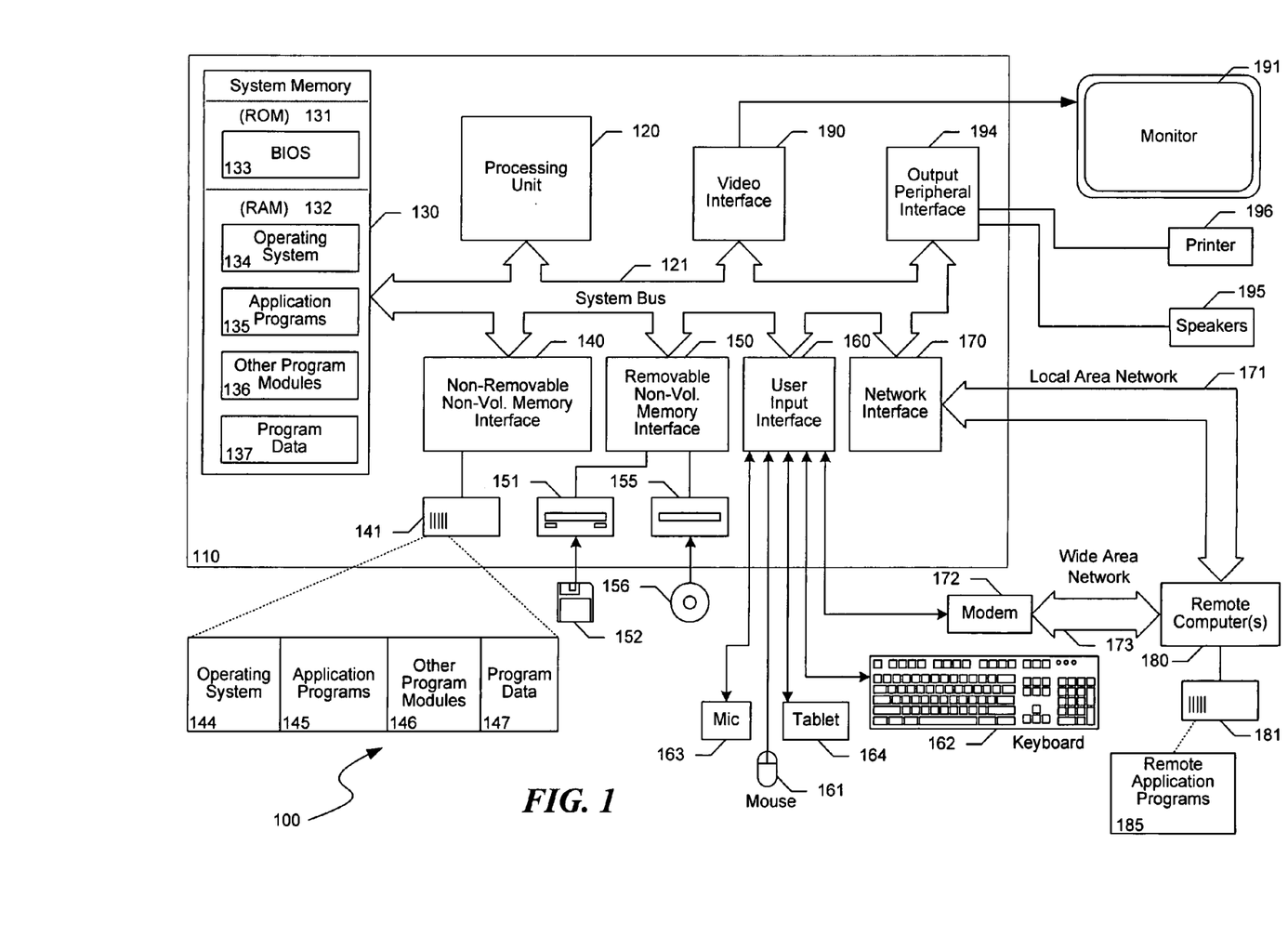
FIG. 1 is a block diagram illustrating an example of a suitable computing environment in which the facility may operate.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary computing system 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set-top boxes, programmable consumer electronics, network PCs, minicomputers, mainframe computers, routers, switches, access points, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media, including memory storage devices.

With reference to FIG. 1, an exemplary system for implementing the facility includes a general purpose computing device in the form of a computer 100. Components of the computer 100 may include, but are not limited to, a processing unit 120, a system memory 130, and a system bus 121 that couples various system components, including the system memory 130 to the processing unit 120. The system bus 121 may be any of several types of bus structures, including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The computer 100 typically includes a variety of computer-readable media. Computer-readable media can be any available media that can be accessed by the computer 100 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 100. Communications media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory, such as read only memory (ROM) 131 and random access memory (RAM) 132. A basic input/output system (BIOS) 133, containing the basic routines that help to transfer information between elements within the computer 100, such as during startup, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary computing system environment 110 include, but are not limited to, magnetic tape cassettes, flash memory cards, digital versatile disks, digital video tapes, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 100. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 100 through input devices, such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 100 is incorporated, such as in a tablet-type personal computer. In addition, computing devices such as the computer 100 may also include other peripheral output devices such as speakers 195 and a printer 196, which may be connected through an output peripheral interface 194 or the like.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 100 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 100, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
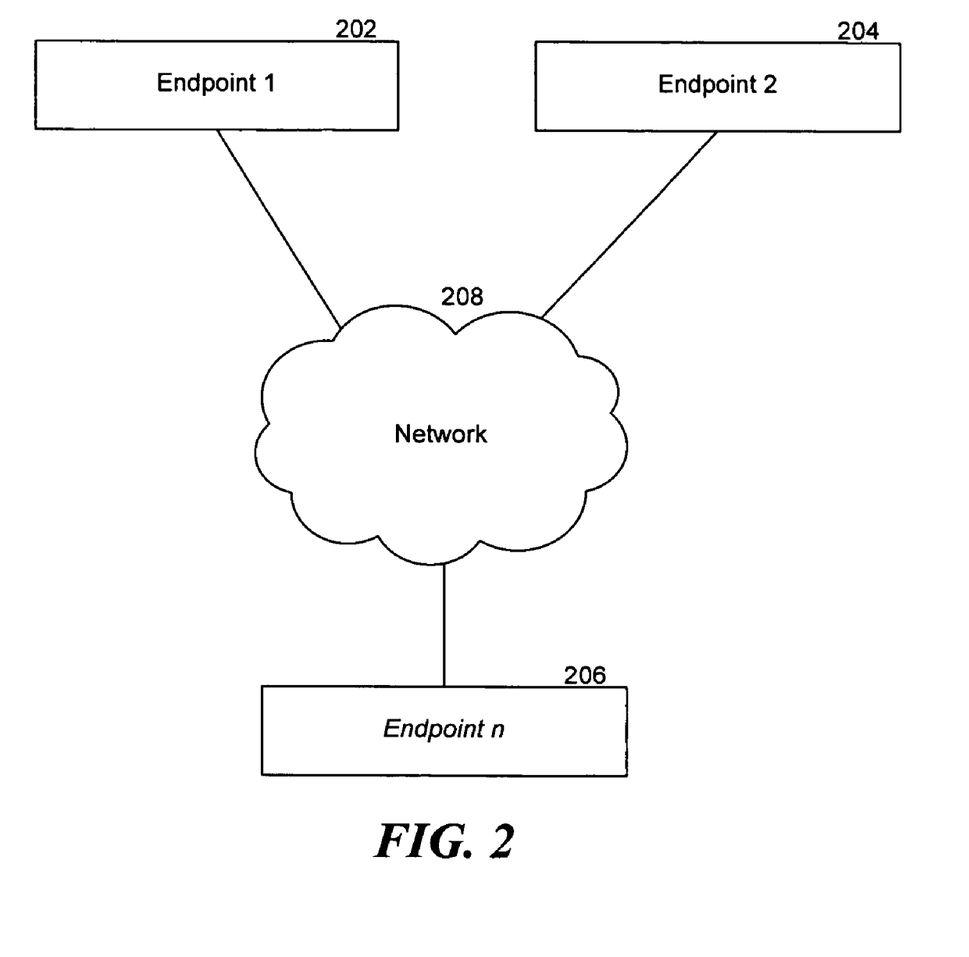
FIG. 2 is a block diagram illustrating an example of a suitable operating environment in which the facility may operate in some embodiments.

FIG. 2 is a block diagram illustrating an example of a suitable operating environment in which the facility may operate in some embodiments. The operating environment comprises one or more endpoints 202, 204, and 206. The endpoints can be interconnected using a network 208, such as an intranet or the Internet. In various embodiments, the endpoints are implemented as hardware or software. As examples, the endpoints can be computing devices, such as a computing device described above in relation to FIG. 1, applications, services, operating system components, and so forth.

In some embodiments, the facility enables two applications (or endpoints) operating on a single computing device to communicate alerts between each other. In some embodiments, the facility communicates alerts from an endpoint operating on one computing device to endpoints operating on one or more other computing devices. The applications or endpoints on the computing devices can be unrelated and indeed may not even be designed to function with one another. As an example, a service provider operating a stock quote service may send an alert that a stock price has reached a specified threshold to multiple endpoints that are designed to receive such alerts, though not necessarily from the service provider's stock quote service.

Figure 3:
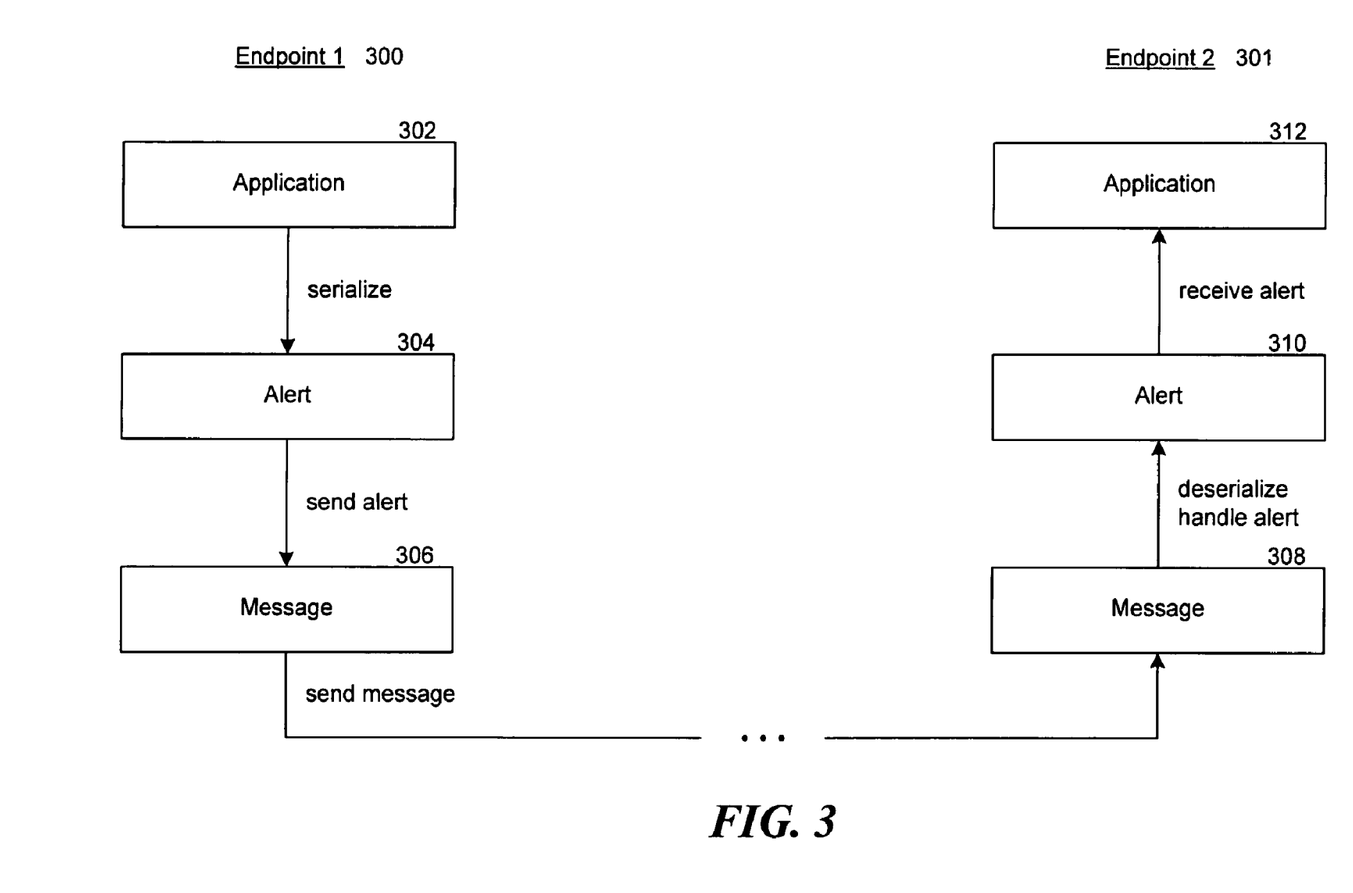
FIG. 3 is a data flow diagram illustrating how the facility handles an alert in some embodiments.

FIG. 3 is a data flow diagram illustrating how the facility handles an alert in some embodiments. In the illustrated embodiment, a source endpoint 300 sends an alert to a recipient endpoint 301. The endpoints can operate on the same or different computing devices.

Figure 4:
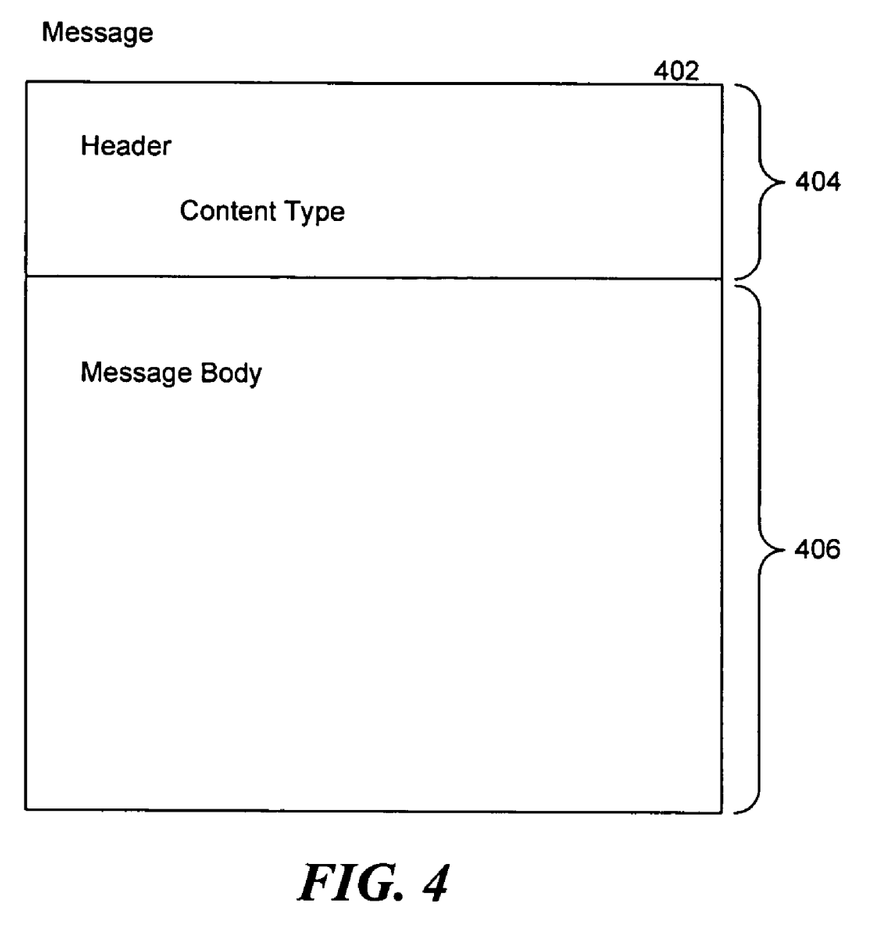
FIG. 4 is a block diagram illustrating an alert message in some embodiments.

An application 302 operating on endpoint 300 may need to send an alert to an application 312 operating on endpoint 301. In some embodiments, the application and endpoint may be the same entity. The endpoint that sends the alert first encapsulates the alert into an alert message. An alert message is illustrated in FIG. 4 and described in further detail below.

The facility serializes data to create an alert 304. As an example, the facility invokes a serialize method provided by the registered alert object to serialize binary data into text (or UTF) that can be placed in the body of a SIP message.

The facility then invokes a SendAlert method implemented by the registered alert object to send the serialized alert. This method employs other aspects of the facility to create a message 306, such as a SIP request, and sends the request to the recipient endpoint.

The device on which the recipient endpoint operates receives the message as message 308. Based on the alert type of the message, the facility invokes a handle_alert method provided by an alert object corresponding to the alert type. As an example, the facility may determine from a Content-type field contained in the message that the message contains Alert Type "a," and so it invokes a handle_alert method provided by corresponding Handler 1. (See Table 1.) The handle_alert method (or some other component of the facility) may then invoke a deserialize method to transform portions of the message (e.g., the message's body) into data types associated with the alert to create an alert 310.

The facility may then invoke a method of an application 312 associated with the recipient endpoint, such as a receive_alert method, to provide the alert to the application.

A similar data flow occurs when an endpoint sends an alert to multiple endpoints. As an example, an alert may need to be sent to a user and the user has logged on to multiple devices or is using multiple applications. In such a case, the facility may send the alert to multiple destinations. When an alert needs to be sent to multiple endpoints, another entity (not shown) tracks which devices (or endpoints) are associated with a particular user. This information may be communicated to the sending endpoint so that the sending endpoint can send multiple alerts, one to each device or endpoint. Alternatively, the entity that tracks devices or endpoints associated with the recipient may cause the alert to be duplicated and forwarded to all devices or endpoints.

FIG. 4 is a block diagram illustrating an alert message in some embodiments. The alert message 402 is a SIP message that has a header section 404 and a body section 406.

The header section contains various header fields, including a Content-type header field. In some embodiments, the facility indicates the alert type in the Content-type header field. A SIP message (e.g., a request) generally contains these additional header fields: To, From, CSeq, Call-ID, Max-Forwards, and Via. The To header field indicates an address of the recipient endpoint. The From header field indicates an address of the source endpoint.

The body section of a message contains what is generally referred to as a message payload. The facility employs the body section to carry a serialized version of the alert. SIP message bodies are generally in plain text or UTF. However, other message body types are possible with various other protocols.

Figure 5:
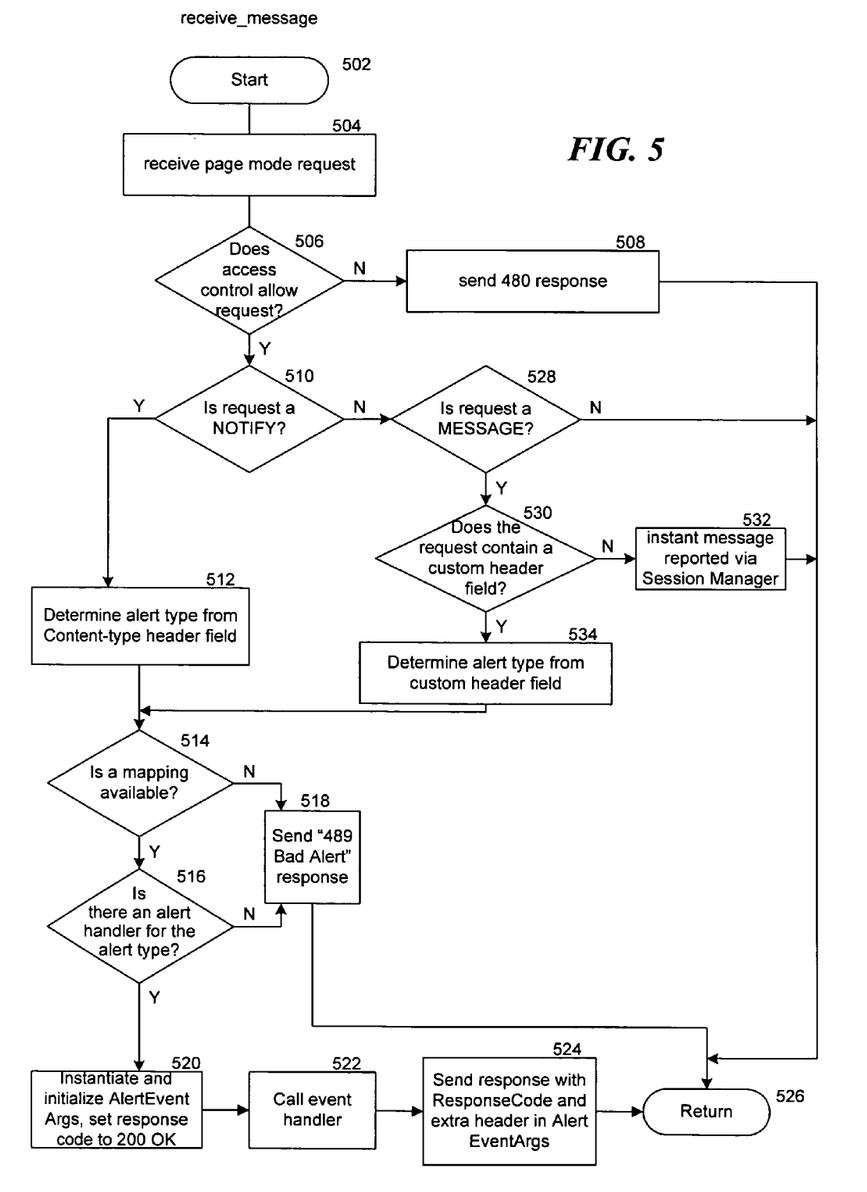
FIG. 5 is a flow diagram illustrating a receive_message routine invoked by the facility in some embodiments.

FIG. 5 is a flow diagram illustrating a receive_message routine invoked by the facility in some embodiments. The facility invokes the routine when it receives a message, such as a SIP request. The routine begins at block 502.

At block 504, the routine receives a Page Mode request. A Page Mode request is a message that an endpoint sends to another endpoint outside a dialog or session. SIP Page Mode messages are generally characterized by their lack of Contact header fields. In various embodiments, the facility may receive other message types.

At decision block 506, the routine determines whether access control settings allow the received request. As an example, an administrator may have indicated that requests received from a particular address are not to be allowed. If the incoming request is not to be allowed, the routine continues at block 508. Otherwise, the routine continues at block 510.

At block 508, the routine sends a response to the endpoint that sent the request indicating that it cannot handle the request. As an example, the routine sends a SIP 480 response indicating that the service is temporarily unavailable. The routine then continues at block 526 where it returns.

At decision block 510, the routine determines whether the request is a NOTIFY message. In some embodiments, the routine may check for other message types. If the request is a NOTIFY message, the routine continues at block 512. Otherwise, the routine continues at decision block 528.

At block 512, the routine determines the type of alert contained in the request. As an example, the routine may make this determination by analyzing a Content-type message header field. As an example, this message header field may indicate that the alert contained in the message is Alert Type "a." (See Table 1.)

At decision block 514, the routine determines whether a mapping is available for the determined alert type. As an example, the routine may determine whether an Alert Type "a" appears in the mapping table. When a mapping is available for the determined alert type, the routine continues at decision block 516. Otherwise, the routine continues at block 518.

At decision block 516, the routine determines whether an alert handler is associated with the determined alert type. When an alert handler is associated with the determined alert type, the routine continues at block 520. Otherwise, the routine continues at block 518.

At block 518, the routine sends an indication to the entity that sent the request that the received alert cannot be recognized. As an example, the routine may send a SIP 489 response indicating that the alert could not be recognized. The routine then continues at block 526 where it returns.

At block 520, the routine instantiates and initializes an object deriving from the AlertEventArgs class. As an example, the routine may copy the received alert into the Alert property of the instantiated object. The routine may also set its ResponseCode property to 200 to indicate that the alert was successfully processed. When the alert handler is invoked for the alert, it may reset this property to another value that could be returned to the source endpoint that sent the request.

At block 522, the routine invokes the alert handler that was determined at block 516 to be associated with the received alert type. The alert handler processes the alert contained in the received request and may reset the ResponseCode property of the object instantiated at block 520. The alert handler may also deserialize the alert in the message to transform its data from a data representation that is compatible with the protocol to a data representation that is compatible with the alert object, handler, or application.

At block 524, the routine may send a response to the endpoint that sent the request. The routine may also add header information to the response or send any additional header information that was provided in the instantiated object. The routine then continues at block 526 where it returns.

When the received request is not a NOTIFY message, the routine continues at decision block 528 from decision block 510. At decision block 528, the routine determines whether the received request is a MESSAGE type of request. When the received request is a MESSAGE type of request, the routine continues at decision block 530. Otherwise, the routine continues at block 526 where it returns.

At decision block 530, the routine determines whether the received request contains a custom header field. As an example, a MESSAGE type of request may contain a "Ms-Alert" header field. This header field indicates to all endpoints and other devices handling the request that the message contains an alert. If the received request contains the custom header field, the routine continues at block 534. Otherwise, the routine continues at block 532.

In some embodiments, when a MESSAGE type of request does not contain the custom header field, the routine employs a standard facility, such as an instant message application to report the received alert to the user of the recipient endpoint, such as is illustrated in block 532. The routine then continues at block 526 where it returns.

At block 534, the routine determines the alert type from the custom header field. This process would be similar to determining the alert type from a standard header field, such as the Content-type header field. The routine then continues at decision block 514.

Thus, when a request is received, the routine determines whether there is an associated alert handler and causes the alert handler to handle the alert.

Figure 6:
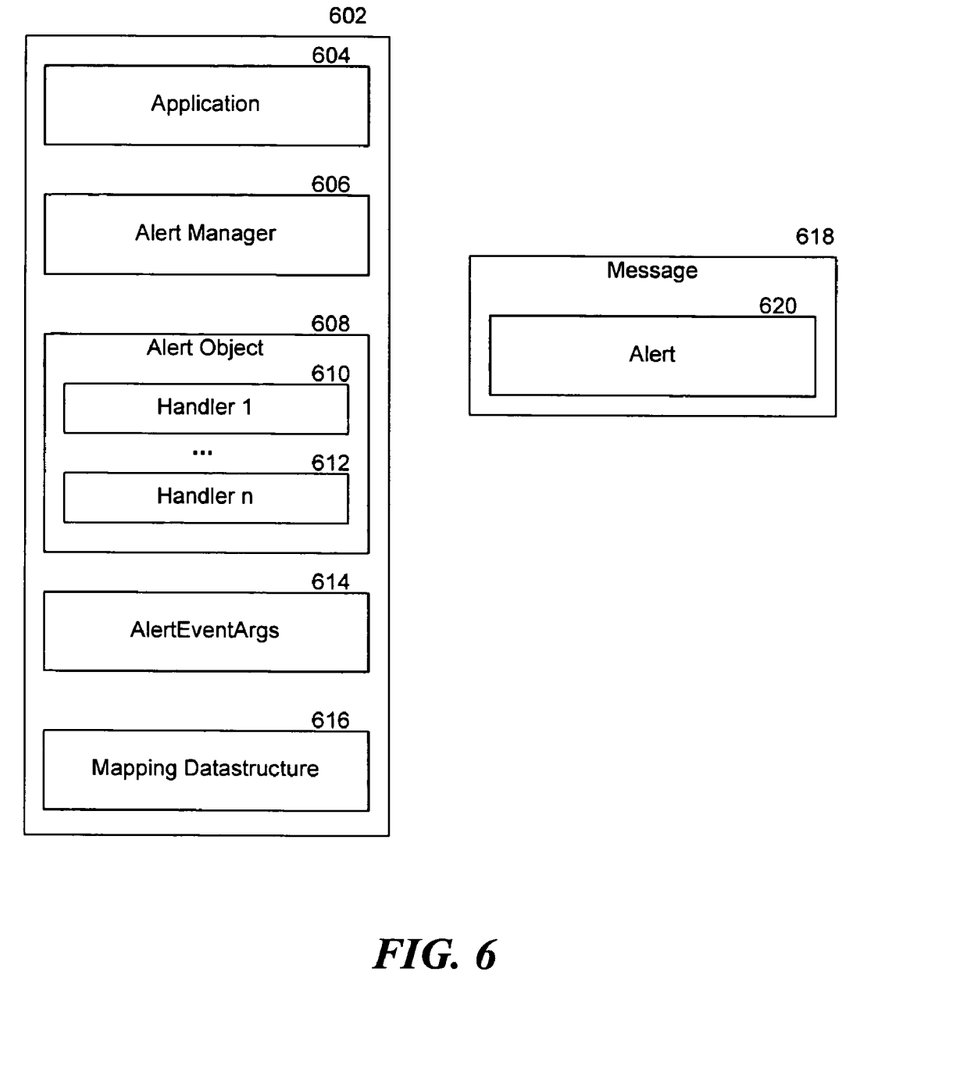
FIG. 6 is a block diagram illustrating components of the facility in various embodiments.

FIG. 6 is a block diagram illustrating components of the facility in various embodiments. The facility has various associated objects and data structures 602. As examples, the facility can be associated with an application 604 that receives or sends alerts. The facility has an alert manager 606 and an alert object 608 that may be associated with the application. The alert object may provide one or more handlers 610 or 612 that handle alerts. The facility may employ an AlertEventArgs component 614 to provide event-related information to the application. The facility also has a mapping datastructure 616, such as a table, registry, database, or other data structure for storing associations between handlers, alert types, alert objects, applications, and so forth.

The facility also receives or sends messages 618 that may contain alerts 620.

From the foregoing, it will be appreciated that specific embodiments of the invention have been described herein for purposes of illustration, but that various modifications may be made without deviating from the spirit and scope of the invention. As an example, the serialized alert can include an entire executable object. A recipient endpoint could then deserialize and execute the received executable object. Although the subject matter has been described in language specific to structural features and/or methodological arts, it is to be understood that the subject matter defined in the appended claims is not necessarily limited to the specific features or acts described above. Accordingly, the invention is not limited except as by the appended claims.

We claim:

1. A method performed by a computer system, having a processor and memory, for handling alerts, comprising:
    registering, via an application program interface that is capable of registering at least three event handlers, a first alert handler and a second alert handler, wherein the registering is caused by two or more applications that are configured to generate or handle alerts;
    receiving a first message at a recipient endpoint, the message having a header field, the endpoint running an application that is configured to receive alerts;
    determining by the processor from the header field of the received first message a type of alert contained in the message and that the first alert handler is registered at the recipient endpoint to handle the type of alert contained in the received first message, the handler associated with the running application;
    deserializing a portion of the message to transform data from a data format carried by the message to a data format handled by the first alert handler;
    causing the first alert handler to handle the alert;
    receiving a second message at the recipient endpoint; and
    determining from a header field of the second message that the second alert handler is to handle an alert included in the second message.

2. The method of claim 1 wherein the message is received using a session initiation protocol.

3. The method of claim 2 wherein the header field is a custom header field.

4. The method of claim 3 wherein the custom header field is Ms-Alert.

5. The method of claim 2 wherein the header field is a Content-type header field.

6. The method of claim 1 wherein the data format carried by the message is textual and the data format handled by the alert handler is binary.

7. The method of claim 1 wherein the alert contains an object.

8. The method of claim 1 wherein the causing includes causing the handler to provide an indication of the deserialized data to the application.

9. A system for handling alerts in an extensible manner, comprising:
    a processor and memory;
    an application program interface configured to register one or more alert handler components;
    an endpoint component that has an associated application, the application configured to receive alerts;
    an alert handler component provided by the application for handling received messages and providing alerts to the application associated with the endpoint, the alert handler component registered by the application via the application program interface; and
    a message transport component that receives a message, determines that the message contains an alert, locates an alert handler to handle the alert, and provides a portion of the received message to the alert handler component so that the alert handler component can handle the alert.

10. The system of claim 9 wherein the application provides an indication of received alerts to a user.

11. The system of claim 9 wherein the alert handler is configured for use by an alert object that is associated with the application, the alert object configured to use multiple alert handlers, each alert handler handling a different type of alert.

12. The system of claim 9 wherein the message transport component receives a message that arrives using a session initiation protocol.

13. The system of claim 9 wherein the message transport component determines that the message contains an alert when the message is a session initiation protocol NOTIFY request identifying an alert type in a Content-type message header field.

14. The system of claim 9 wherein the message transport component determines that the message contains an alert when the message is a session initiation protocol MESSAGE request identifying an alert type in a custom message header field.

15. A computer-readable storage device storing instructions that, when executed by a computing system cause the computing system to perform a method, the instructions comprising:

receiving via an application program interface requests from a first application and a second application to register alert handlers that are associated with alert objects of the first and second applications, the alert handlers identifying a set of alert types that the alert handlers are configured to handle, the alert object having multiple associated alert handlers;

adding an indication of the alert handlers in a mapping data structure to determine correspondences between alert types and alert handlers;

upon receiving a message containing an alert, identifying an alert handler to handle the alert contained in the message; and invoking a method provided by the identified alert handler to handle the alert contained in the message so that the alert can be provided to the application.

16. The computer-readable storage medium of claim 15 wherein the request is received by a method provided by an application program interface.

17. The computer-readable storage medium of claim 15 wherein the method further comprises retrieving data stored in the mapping data structure to identify the alert handler to handle the alert contained in the message.

18. The computer-readable storage medium of claim 15 wherein the method further comprises deserializing data contained in the message to transform the data from a data format that a protocol used to carry the message can employ to another data format that the protocol used to carry the message cannot employ.

19. The computer-readable storage medium of claim 15 wherein the method further comprises receiving a request to send an alert.

20. The computer-readable storage medium of claim 19 wherein the method further comprises serializing the alert to transform it from a data format that is incompatible with a protocol used to carry the alert to another data format that is compatible with the protocol used to carry the alert.

* * * * *